(12) United States Patent
Hirche et al.

(10) Patent No.: US 12,399,021 B2
(45) Date of Patent: Aug. 26, 2025

(54) METHOD FOR CLASSIFYING ENERGY CONSUMERS IN A VEHICLE

(71) Applicant: VOLVO TRUCK CORPORATION, Gothenburg (SE)

(72) Inventors: Mark Hirche, Hisings Kärra (SE); Faisal Altaf, Västra Frölunda (SE); Bassem Farag, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 109 days.

(21) Appl. No.: 18/296,036

(22) Filed: Apr. 5, 2023

(65) Prior Publication Data
US 2023/0324190 A1   Oct. 12, 2023

(30) Foreign Application Priority Data
Apr. 7, 2022  (EP) ..................................... 22167153

(51) Int. Cl.
G01C 21/34   (2006.01)

(52) U.S. Cl.
CPC ..... G01C 21/3469 (2013.01); G01C 21/3492 (2013.01)

(58) Field of Classification Search
CPC .......................... G01C 21/3469; G01C 21/3492
(Continued)

(56) References Cited

U.S. PATENT DOCUMENTS 8,554,468 B1   10/2013   Bullock
8,694,232 B2 *   4/2014   Kono ................. G01C 21/3469
                                                               701/123

(Continued)

FOREIGN PATENT DOCUMENTS

DE   102019203517 B4   2/2022
EP   2597539 A1   5/2013
(Continued)

OTHER PUBLICATIONS

European Search Report dated Oct. 10, 2022 in corresponding European Patent Application No. 22167153.0 , 8 pages.
(Continued)

*Primary Examiner* — Luis A Martinez Borrero
(74) *Attorney, Agent, or Firm* — Venable LLP; Jeffri A. Kaminski

(57) ABSTRACT

The method comprises providing preview information comprising at least one of a predicted road condition and a predicted road event; processing the preview information with an estimation model adapted to relate a risk level associated with a power unavailability for each one of the energy consumers to the at least one predicted road condition and/or predicted road event; classifying the energy consumers having a risk level higher than a predetermined risk level threshold value as critical energy consumers, and classifying the energy consumers with a risk level lower than the predetermined risk level threshold value as non-critical energy consumers; estimating a required amount of energy and/or power for powering all the energy consumers in the predetermined group of energy consumers for the predicted road condition and/or the predicted road event; estimating the available energy and/or power of the EST system; in response to determining that the required amount of energy for powering all the energy consumers in the predetermined group of energy consumers is higher than the available energy, powering the energy consumers classified as critical, and deactivating at least one of the energy consumers classified as non-critical.

14 Claims, 3 Drawing Sheets

(58) Field of Classification Search
USPC .......................................................... 701/123
See application file for complete search history.

(56) References Cited

U.S. PATENT DOCUMENTS

| | | | |
|---|---|---|---|
| 9,043,106 B2* | 5/2015 | Ingram | B64U 50/19 |
| | | | 701/423 |
| 9,440,553 B2* | 9/2016 | Kuhn | B60W 50/0097 |
| 9,802,617 B1* | 10/2017 | Eisenhour | B60K 25/00 |
| 9,869,723 B2 | 1/2018 | Wu | |
| 10,608,444 B2 | 3/2020 | Kaneko | |
| 10,676,077 B2* | 6/2020 | Follen | B60W 10/30 |
| 11,067,403 B2* | 7/2021 | Lindemann | B60W 50/0098 |
| 11,208,062 B2* | 12/2021 | Weber | B60W 30/182 |
| 11,247,552 B2* | 2/2022 | Follen | B60W 20/12 |
| 11,300,619 B2* | 4/2022 | Brown | B60W 50/0097 |
| 11,329,327 B2 | 5/2022 | Nishikawa et al. | |
| 11,346,678 B2* | 5/2022 | Trancik | G06Q 10/0631 |
| 2003/0158638 A1 | 8/2003 | Yakes et al. | |
| 2007/0112475 A1* | 5/2007 | Koebler | G01C 21/3617 |
| | | | 701/1 |
| 2008/0275644 A1* | 11/2008 | Macneille | B60K 6/365 |
| | | | 701/414 |
| 2013/0261914 A1* | 10/2013 | Ingram | G01C 21/3469 |
| | | | 701/423 |
| 2015/0232097 A1* | 8/2015 | Luther | G01C 21/3415 |
| | | | 701/1 |
| 2015/0239365 A1* | 8/2015 | Hyde | B60L 58/26 |
| | | | 701/2 |
| 2015/0241310 A1* | 8/2015 | Brown | G06Q 10/04 |
| | | | 702/179 |
| 2015/0258912 A1* | 9/2015 | Kuhn | B60W 50/085 |
| | | | 701/22 |
| 2015/0321572 A1 | 11/2015 | Koch et al. | |
| 2015/0344036 A1* | 12/2015 | Kristinsson | B60W 50/0097 |
| | | | 701/22 |
| 2015/0373583 A1* | 12/2015 | Yousefi | H04L 47/76 |
| | | | 370/237 |
| 2016/0137089 A1 | 5/2016 | Wu et al. | |
| 2016/0332616 A1 | 11/2016 | Zhao et al. | |
| 2017/0225584 A1 | 8/2017 | Jin et al. | |
| 2018/0178741 A1* | 6/2018 | Poeppel | B60R 16/0236 |
| 2018/0188051 A1* | 7/2018 | Gaspard-Boulinc | G08G 5/20 |
| 2019/0107406 A1* | 4/2019 | Cox | G01S 19/42 |
| 2020/0001741 A1* | 1/2020 | Fairweather | B60L 58/27 |
| 2021/0024092 A1* | 1/2021 | Han | B60L 3/0092 |
| 2021/0048480 A1 | 2/2021 | Lim et al. | |
| 2021/0175572 A1 | 6/2021 | He et al. | |
| 2021/0190867 A1 | 6/2021 | Fan et al. | |
| 2021/0213896 A1 | 7/2021 | Cox et al. | |

FOREIGN PATENT DOCUMENTS

| | | |
|---|---|---|
| WO | 2021010113 A1 | 1/2021 |
| WO | 2021121673 A1 | 6/2021 |
| WO | 2021254620 A1 | 12/2021 |

OTHER PUBLICATIONS

European Search Report dated Oct. 17, 2022 in corresponding European Patent Application No. 22167162.1 , 8 pages.

Non-Final Office Action dated Feb. 27, 2025 in corresponding U.S. Appl. No. 18/296,063, 7 pages.

Notice of Allowance dated Jul. 11, 2025 in corresponding U.S. Appl. No. 18/296,063, 6 pages.

* cited by examiner

METHOD FOR CLASSIFYING ENERGY CONSUMERS IN A VEHICLE

CROSS-REFERENCE TO RELATED APPLICATIONS

This patent application claims the priority to European application of 22167153.0, filed Apr. 7, 2022, all of which is hereby incorporated by reference in its entirety.

TECHNICAL FIELD

The present invention relates to a method and system for classifying energy consumers in a vehicle into critical and non-critical energy consumers. The invention furthermore relates to a vehicle, a computer program, a computer readable medium and a controlling apparatus.

The invention may be applied in any electrically operated heavy-duty vehicles, such as trucks, buses and construction equipment. Although the invention will be described with respect to a fully electrified heavy-duty truck, the invention is not restricted to this particular vehicle, but may also be used in other vehicles such as buses, trailers, wheel loaders, excavators, passenger cars, etc. It is applicable in fully electrically operated vehicles as well as in hybrid vehicles, comprising also a combustion engine.

The invention may also be applied in electric systems of e.g. electrically propelled and operated various working machines and passenger cars.

BACKGROUND

A vehicle typically comprises an engine for propelling the vehicle. The engine may be powered by various means, such as e.g. by liquid or gaseous fuel in an internal combustion engine, or by electric power in an electric machine. Moreover, hybrid solutions exist in which the vehicle is propelled both by an internal combustion engine and an electric machine. In either way, energy storage devices are used to store the energy needed in order to operate the engine for propelling the vehicle. For an electric machine, the energy storage devices may be batteries or supercapacitors, or, in case the vehicle is equipped with a fuel-cell system, the fuel cells being energy transformation devices, the energy storage devices are hydrogen containing storages. The energy storage device and the energy transformation devices may commonly be referred to as energy storage or transformation devices, and the system to which they belong may be referred to as an energy storage or transformation system.

The energy storage or transformation system are thus used in the vehicle for providing propulsion power for traction. In certain situations, the propulsion power is particularly needed, e.g. when a vehicle is subject to a potentially hazardous situation, like passing a railway crossing, for which a sufficient propulsion power is required to get out of the hazardous situation, e.g. to cross the railway crossing. Thus, the readiness of propulsion power and the availability of the energy storage or transformation system are important factors for vehicle safety. For internal combustion engine vehicles, a high availability of propulsion power is based on concepts where in case of e.g. a restart of an ECU, the ECU synchronizes itself to the still ongoing combustion process. Compared to internal combustion engine vehicles, electric vehicles are facing other challenges and uncertainties regarding e.g. electric range, drivability, power availability, and remaining-useful-life of vehicles mainly due to complex electrochemical, thermal, and ageing dynamics of the energy storage or transformation devices. Also safety hazards like short-circuit, explosion in case of vehicle crash, thermal runway, etc are important to supervise. Moreover, as the energy storage or transformation system typically power other energy consumers than the traction electric machine, there may not, at least temporarily, be enough energy or power available for satisfying the required need. This may be particularly true when the energy storage or transformation system powers high loads, as e.g. an electric power take-off driven equipment in a working machine.

Therefore, the energy storage or transformation system of an electric vehicle requires advanced monitoring, control, and fault diagnostics to manage all these robustness and safety issues. In spite of such advanced monitoring, the energy storage or transformation system may be subject to a fault or error, or simply be unable to provide the required power and energy, which may lead to problems. Thus, there is a drive in the industry for an improved availability of the energy storage and transformation system.

SUMMARY

It is an object of the present invention to at least partly alleviate the shortcomings discussed above in relation to known energy storage or transformation systems, and to improve the availability of the energy storage or transformation systems, at least for certain particular conditions.

According to at least a first aspect of the present invention, a method for classifying a predetermined group of energy consumers in a vehicle into critical and non-critical energy consumers, the energy consumers being powered by an energy storage or transformation, EST, system, is provided. The method comprises:
  providing preview information of the vehicle operation, the preview information comprising at least one of a predicted road condition and a predicted road event;
  processing the preview information with an estimation model adapted to relate a risk level associated with a power unavailability for each one of the energy consumers to the at least one predicted road condition and/or predicted road event;
  classifying the energy consumers having a risk level higher than a predetermined risk level threshold value as critical energy consumers, and classifying the energy consumers with a risk level lower than the predetermined risk level threshold value as non-critical energy consumers;
  estimating a required amount of energy and/or power for powering all the energy consumers in the predetermined group of energy consumers for the predicted road condition and/or the predicted road event;
  estimating the available energy and/or power of the EST system;
  in response to determining that the required amount of energy and/or power for powering all the energy consumers in the predetermined group of energy consumers is higher than the available energy and/or power of the EST system for the predicted road condition and/or the predicted road event, powering the energy consumers classified as critical, and deactivating at least one of the energy consumers classified as non-critical.

Hereby, the availability of the EST system, at least for certain particular conditions, is improved. That is, the EST system is able to power the critical energy consumers at the expense of the non-critical energy consumer(s), in case the available energy and/or power of the EST system is limited (i.e. that the required amount of energy and/or power for powering all the energy consumers in the predetermined group of energy consumers is higher than the available energy and/or power of the EST system) for the predicted road condition and/or the predicted road event, or at least limited for a time period associated with the predicted road condition and/or predicted road event. Thus, when stating that "the required amount of energy and/or power is limited", the available energy and/or power of the EST system is not enough to cover the required amount of energy and/or power for avoiding power unavailability of at least one of the energy consumers in the predetermined group of energy consumers associated with the predicted road condition and/or predicted road event. Thus, for the predicted road condition and/or the predicted road event and the corresponding (upcoming) vehicle situation, the EST system is not able to sufficiently respond to the power request of the energy consumers, or is not able to sufficiently energize the energy consumer of the time period associated with the predicted road condition and/or predicted road event, and at least one energy consumer will suffer from power unavailability at the predicted road condition and/or the predicted road event. The reason for that the EST system is not able to sufficiently respond to the power or energy request of the energy consumers may e.g. be the result of a fault or error in the EST system, too low SoC (State of Charge), too high temperature, and/or too high imbalance between battery cells, in one or several of the battery packs in case the EST system is a battery system.

In other words, the estimation model is adapted to relate the level of risk for a power unavailability for each one of the energy consumers for a vehicle situation based on the preview information (i.e. at least the predicted road condition or the predicted road event). Hereby, the classification of the energy consumers into critical and non-critical energy consumers can be achieved by classifying critical energy consumers as those associated with a relatively high risk in case of power unavailability (i.e. having a risk level higher than the predetermined risk level threshold value), and classifying non-critical energy consumers as those associated with a relatively low risk in case of power unavailability (i.e. having a risk level lower than the predetermined risk level threshold value). Stated differently, by estimating the level of risk related to power unavailability for each one of the energy consumers in the predetermined group of energy consumers in response to the preview information, the classification of the energy consumers into critical and non-critical can be improved.

According to at least one example embodiment, the step of estimating required amount of energy and/or power for powering all the energy consumers in the predetermined group of energy consumers for the predicted road condition and/or the predicted road event may correspond to avoiding power unavailability of at least one of the energy consumers in the predetermined group of energy consumers. The step of estimating required amount of energy and/or power for powering all the energy consumers in the predetermined group of energy consumers for the predicted road condition and/or the predicted road event is thus carried out in response to the preview information of the vehicle operation. That is, the required amount of energy and/or power for avoiding power unavailability of at least one of the energy consumers in the predetermined group of energy consumers is based on the preview information. The predetermined group of energy consumers may e.g. be all energy consumers which is powered by the EST system (i.e. the energy consumers being connected to the EST system such that they can be powered by the EST system).

According to at least one example embodiment, the step of estimating the available energy and/or power of the EST system is carried out for the predicted road condition and/or the predicted road event. That is, the available energy and/or power of the EST system may be based on the preview information. In other words, the energy and/or power capability of EST system may be determined in response to the preview information of the vehicle operation. The available energy and/or power of the EST system, and how this availability varies over time, may thus be determined relative to the preview information, or the time period associated with the predicted road condition and/or the predicted road event.

It should be noted that the required amount of power (momentarily) for powering all the energy consumers in the predetermined group of energy consumers for the predicted road condition and/or the predicted road event may be estimated and thus compared with the estimated available corresponding power of the EST system, and/or that the required amount of energy (over time) for powering all the energy consumers in the predetermined group of energy consumers for the predicted road condition and/or the predicted road event may be estimated and thus compared with the estimated available corresponding energy of the EST system. Preferably, the number of energy consumers classified as non-critical which is/are deactivated is adapted to enable powering of the energy consumers classified as critical.

According to at least one example embodiment, the risk level associated with power unavailability for each one of the energy consumers is determined in accordance with ISO 26262 (titled "Road vehicles—Functional safety") utilizing the Hazard Analysis and Risk Assessment, HARA. Typically, the risk level is based on the ASIL Assessment Process, and the Severity classifications (S0-S3). Moreover, the risk level may be based on the Exposure Classifications (E0-E4) and/or Controllability classifications (C0-C3). For example, the predetermined risk level threshold value may be determined by such ASIL Assessment Process. Thus, the risk level of power unavailability for each one of the energy consumers is typically determined in response to vehicle safety.

According to at least one example embodiment, the classification of the energy consumers is performed dynamically.

Hereby, the classification of the energy consumers into critical and non-critical may change over time, and in particular in response to the varying preview information. Thus, for different predicted road events and/or road conditions, the energy consumers may be prioritized differently, as different energy consumers may be related to a high risk level (i.e. higher than the predetermined risk level threshold value) in case of power unavailability. For example, if the predicted road event comprises a parking lot in which the vehicle is to be parked, operation of the turn signals may be classified as critical, while air condition of the vehicle is classified as non-critical. Another example of a precited road event is an upcoming steep downhill. The operation of the turn signals may be classified as non-critical, while electric emergency braking is classified as critical, and/or wherein the electric retardation braking (i.e., auxiliary electric regenerative braking to support main mechanical service brakes) is classified as critical. Here, the turn signals, the air condition, the electric emergency braking and the electric retardation braking are examples of energy consumers included in the predetermined group of energy consumers.

According to at least one example embodiment, at least one of the energy consumers in the predetermined group of energy consumers is a traction electric machine, wherein the step of classifying the energy consumers comprises classifying the traction electric machine as a critical energy consumer.

Hereby, the traction electric machine is always prioritized, and cannot be classified as a non-critical energy consumer. Another example of a critical energy consumer which may always be prioritized over non-critical energy consumers is electric power steering. Thus, the traction electric machine and the electric power steering are further examples of energy consumers included in the predetermined group of energy consumers.

According to at least one example embodiment, the method comprises:
  identifying, for each one of the energy consumers, a vehicle situation which, in case of power unavailability of the energy consumer for the predicted road condition and/or the predicted road event, belong to a predetermined group of vehicle situations defined as hazardous, and wherein the risk level of the estimation model is determined in response to such hazardous vehicle situations.

The predetermined group of vehicle situations defined as hazardous may comprise, or may be defined by, ISO 26262 (titled "Road vehicles—Functional safety"). For example, the predetermined group of vehicle situations defined as hazardous may be determined by the Hazard Analysis and Risk Assessment, HARA, according to ISO 26262 as previously mentioned. Typically, the HARA includes the ASIL Assessment Process, and the Severity classifications (S0-S3). Moreover, the HARA may include the Exposure Classifications (E0-E4) and/or Controllability classifications (C0-C3) as previously mentioned. For example, the vehicle situation may be considered hazardous by the Severity classification of at least S1, or at least S2 (or S3).

Stated differently, the method may comprise the step of identifying, for each one of the energy consumers, a vehicle situation which in case of power unavailability of the energy consumer results in a potentially harmful situation for the predicted road condition and/or the predicted road event, wherein the risk level in the estimation model is determined in response to such potentially harmful situation. Thus, the risk level associated with a power unavailability for each one of the energy consumers is related to a hazardous vehicle situation, or a potentially harmful situation. As described above, the potentially harmful situation may be defined in accordance with ISO 26262. That is, power unavailability for an energy consumer which lead to a potentially harmful situation, e.g. a hazardous or dangerous upcoming vehicle situation as defined in ISO 26262, may result in the classification that the energy consumer is critical for that particular vehicle situation. Thus, by prioritizing the critical energy consumers in case of a limited availability of energy and/or power in the EST system as earlier described, potentially harmful or hazardous vehicle situations can be avoided. Thus, based on identifying a vehicle situation leading to such hazardous or potentially harmful vehicle situation, the method may comprise the step of operating the EST system such that the critical energy consumers are prioritized over non-critical energy consumers.

According to at least one example embodiment, the vehicle situation is defined as a potentially harmful situation if the expected result of the power unavailability of the energy consumer is hazardous, or that the vehicle situation belongs to the predetermined group of vehicle situations defined as hazardous.

Thus, the risk level associated with power unavailability for each one of the energy consumers is related to a hazardous vehicle situation which is predefined.

According to at least one example embodiment, the vehicle situations belonging to the predetermined group of vehicle situations defined as hazardous has risk level higher than the predetermined risk level threshold value.

According to at least one example embodiment, the preview information defines a predicted or upcoming vehicle situation, at least based on one of predicted road condition and predicted road event. By using preview information, the risk level associated with a power unavailability for the energy consumers can be improved. For example, in case the predicted road event is a train crossing, the risk level associated with a power unavailability for the traction electric machine is increased as a lack of traction could result in that the vehicle is stopped at the train crossing without being able to move for a coming train. Thus, the traction electric machine is classified as a critical energy consumer. Moreover, the electric power steering may be classified as a critical energy consumer. Moreover, by using preview information measures can be taken to respond to upcoming vehicle situation, e.g. by controlling the powering of the critical energy consumers and controlling deactivation of at least one of the non-critical energy consumers. For example, the predicted road condition or predicted road event is typically associated with a traction electric machine operation (or engine operation) or steering operation. Thus, the operation of the traction electric machine operation (or engine) and/or the electric power steering, can be controlled in response to the preview information.

According to at least one example embodiment, the preview information comprises road topography and/or current traffic conditions.

Hereby, the classification of the energy consumers into critical and non-critical can be further improved. That is, the preview information may comprise predicted road conditions such as upcoming topology or topography of the road (e.g. a downhill or uphill) and/or upcoming road curves and/or upcoming road characteristics. The preview information may comprise predicted road events such as current traffic conditions (e.g. expected traffic jams) and upcoming crossings, train crossings, parking lots, traffic lights or the like.

It should be noted that the preview information is related to a future, expected or predicted situation of the vehicle, typically associated with an associated operation of the vehicle. The preview information may be expected to occur in the near future, e.g. in 1 s to 15 min, or in 10 s to 15 min, or in 1 min to 15 min. However, the time span for the preview information may be longer, depending on the predicted route of the vehicle, and may extend over the entire predicted route of the vehicle. Moreover, the time span of the preview information may be a function of the vehicle speed, or predicted vehicle speed along the predicted route of the vehicle. Moreover, the preview information may be information which is related to the predicted route, and which is based on the predicted travel of the vehicle along the predicted route, e.g. predicted road events over a 1 km distance, or a 10 km distance.

According to at least one example embodiment, the estimation model is a statistical model, or a machine learning model formed from data of power unavailability for the energy consumers related to the predicted road condition and/or the predicted road event from the vehicle or from a plurality of vehicles.

Hereby, the classification of the energy consumers into critical and non-critical can be further improved.

The estimation model may according to at least one example embodiment be referred to as a predictive situation and risk aware or risk estimation model. The estimation model may e.g. operate by using the preview information as input data. The preview information may be used together with the predetermined group of vehicle situations defined as hazardous, to list various upcoming vehicle situations (or scenarios). For example, if the preview information comprises road topography information for 10 km ahead along the predicted route of the vehicle, the estimation model may analyze the input data to generate a list of various upcoming vehicle situations, such as e.g. crossing of a railway crossing with low or high likelihood of train presence in the vicinity, over-taking scenario along with duration, travelling up-hill along with duration, travelling downhill along with duration, need of left or right turn of the vehicle etcetera.

Using the list of the various upcoming vehicle situations, the estimation model may then assess which of the energy consumers (of the predetermined group of energy consumers) that are critical in each one of the various upcoming vehicle situations. This type of assessment may be carried out in different ways, as indicated above. For example, a look-up table with predetermined or predefined rules may be used (for example based on HARA and ISO 26262 as previously described). The look-up table may comprise a list of predefined vehicle situations (e.g. defined as hazardous and non-hazardous) and corresponding relevance and criticality of the energy consumers in the predetermined group of energy consumers. For example, a discrete decision tree which guides a vehicle controller to label the energy consumers which are relevant over a given time period associated with the predicted road condition and/or predicted road event in response to the list of the various upcoming vehicle situations can be used. Once all relevant energy consumers are identified, the risk level associated with power unavailability of each energy consumer in any of the upcoming vehicle situations is quantified. The quantification of risk can be achieved based on pre-computed criteria according to HARA as mentioned above.

In another example, machine learning model or a data driven learning-based method may be used. Such model may be based on historical data logged by the vehicle (or a plurality of vehicles) and situational data. Here, a so-called "situation-aware risk assessment model" can be trained using historical data (supervised machine learning model using past driving/vehicle experience and corresponding road events). Historical data regarding severity of injury may be used. Based on this machine learning, a so called "situation-aware supervisor" is achieved, which associates the risk level in each upcoming vehicle situation, and contains corresponding information of the criticality of the energy consumers. For example, the model can process each upcoming vehicle situation as input and provide as output recommendations regarding which of the energy consumers that are relevant and critical, and the associated risk level in case of power unavailability.

According to at least one example embodiment, the method further comprises:
  in response to determining that the required amount of energy and/or power for powering all the energy consumers in the predetermined group of energy consumers is higher than the available energy and/or power of the EST system for the predicted road condition and/or the predicted road event, warning the driver that prioritization of powering the critical energy consumers, and/or that deactivation of at least one of the non-critical energy consumers, are expected.

Hereby, the driver may be notified that non-critical energy consumer(s) is/are expected to be deactivated. Stated differently, by using preview information, e.g. look-ahead road condition or road events such as road topography information, and estimating the predictive energy and/or power ability of the EST system (and possibly the capability of the traction electric machine) an advance warning system is provided that is configured to warn the driver well in advance regarding an upcoming risky vehicle situation.

According to at least one example embodiment, the warning comprises information of the non-critical energy consumers.

However, it should be noted that the non-critical energy consumers are only regarded as non-critical in relation to the critical energy consumers. Thus, for the driver, the non-critical energy consumers may still be desirable to use in the upcoming vehicle situation. By warning the driver of the non-critical energy consumers and the potential power unavailability thereof, the driver may be able to make proper decisions. For example, if driver wants to make an over-taking manoeuvre, the warning can be given if there is a high likelihood that vehicle may not have sufficient propulsion power within next few seconds or minutes to finish this manoeuvre safely.

According to at least one example embodiment, the EST system is an energy storage system, such as e.g. a battery system comprising a plurality of EST devices in the form of battery packs or batteries. According to at least one example embodiment, the EST system is an energy transformation system, such as e.g. a fuel cell system comprising a plurality of EST devices in the form of fuel cells.

According to a second aspect of the present invention, a system for classifying a predetermined group of energy consumers in a vehicle into critical and non-critical energy consumers, the energy consumers being powered by an energy storage or transformation, EST, system, is provided. The system comprises:
  a data acquisition unit configured to acquire preview information of the vehicle operation, the preview information comprising at least one of a predicted road condition and a predicted road event; and
  a control unit configured to:
  process the preview information with an estimation model adapted to relate a risk level associated with a power unavailability for each one of the energy consumers to the at least one predicted road condition and/or predicted road event;
  classify the energy consumers having risk level higher than a predetermined risk level threshold value as critical energy consumers, and classify the energy consumers with a risk level lower than the predetermined risk level threshold value as non-critical energy consumers;
  estimate a required amount of energy and/or power for powering all the energy consumers in the predetermined group of energy consumers for the predicted road condition and/or the predicted road event;
  estimate the available energy and/or power of the EST system;
  in response to determining that the required amount of energy and/or power for powering all the energy consumers in the predetermined group of energy consumers is higher than the available energy and/or power of the EST system for the predicted road condition and/or the predicted road event, powering the energy consumers classified as critical, and deactivating at least one of the energy consumers classified as non-critical.

Effects and features of the second aspect of the invention are largely analogous to those described above in connection with the first aspect of the invention. Embodiments mentioned in relation to the first aspect of the invention are largely compatible with the second aspect of the invention, of which some are exemplified below.

According to a third aspect of the invention, a vehicle comprising a system according to the second aspect of the invention.

According to a fourth aspect of the invention, a computer program comprising program code means for performing the steps the first aspect of the invention, when said program is run on a computer, is provided.

Such computer program may e.g. be implemented in an electronic control unit, ECU, of the vehicle.

According to a fifth aspect of the invention, a computer readable medium carrying a computer program comprising program code means for performing the steps of the first aspect of the invention, when said computer program is run on a computer, is provided.

According to a sixth aspect of the invention, a controlling apparatus for classifying energy consumers in a vehicle into critical and non-critical energy consumers, the controlling apparatus being configured to perform the steps of the method according to the first aspect of the invention, is provided.

Effects and features of the third to sixth aspects of the invention are largely analogous to those described above in connection with the first aspect of the invention. Embodiments mentioned in relation to the first aspect of the invention are largely compatible with the third to sixth aspects of the invention.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
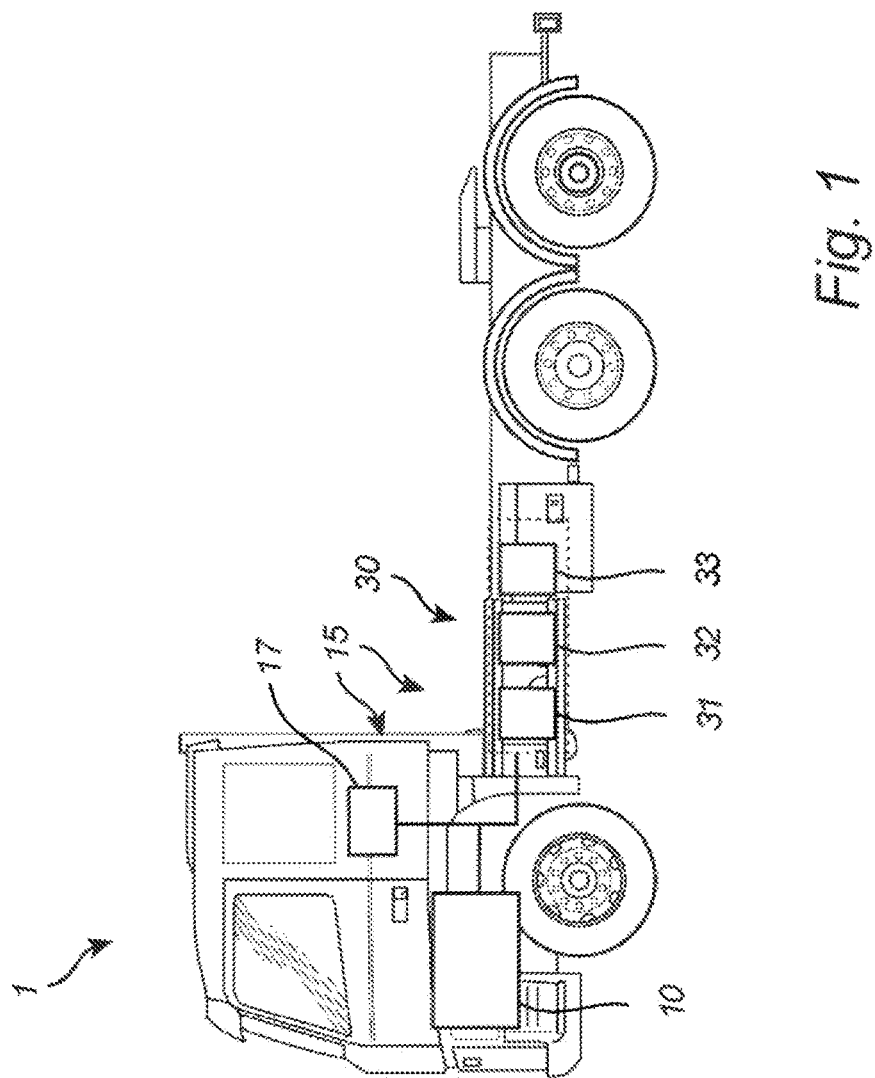
FIG. 1 is a side schematic view of a vehicle in accordance with an example embodiment of the invention.

With reference to FIG. 1, a vehicle 1, here embodied as a heavy duty truck 1, is disclosed for which a method and a system of a kind disclosed in the present invention is advantageous. However, the method and system may as well be implemented in other types of vehicles or vessels, such as in busses, light-weight trucks, passenger cars, marine applications etc. The vehicle 1 is an electric vehicle, such as a full electric vehicle or a hybrid, comprising at least one electric machine 10 powered by the EST system 30 controlled by an EST management system 15. In the example of FIG. 1, the EST system 30 comprises three EST devices 31, 32, 33, being e.g. batteries, supercapacitors or fuel cells. In the following, it is assumed that the EST system 30 is a battery system 30 and that the EST devices 31, 32, 33 are battery packs 31, 32, 33. The EST management system 15 is thus a battery management system 15 configured to manage the battery system 30 and e.g. connected and disconnect the battery packs 31, 32, 33 relative the electric machine 10 and any other energy consumers of the vehicle. Moreover, the battery management system 15 comprises a controlling apparatus 17 arranged and configured for controlling the operation of the battery system 30. The vehicle 1 typically further comprises other parts of the powertrain such as transmission, drive shafts and wheels (not shown in detail).

Figure 2:
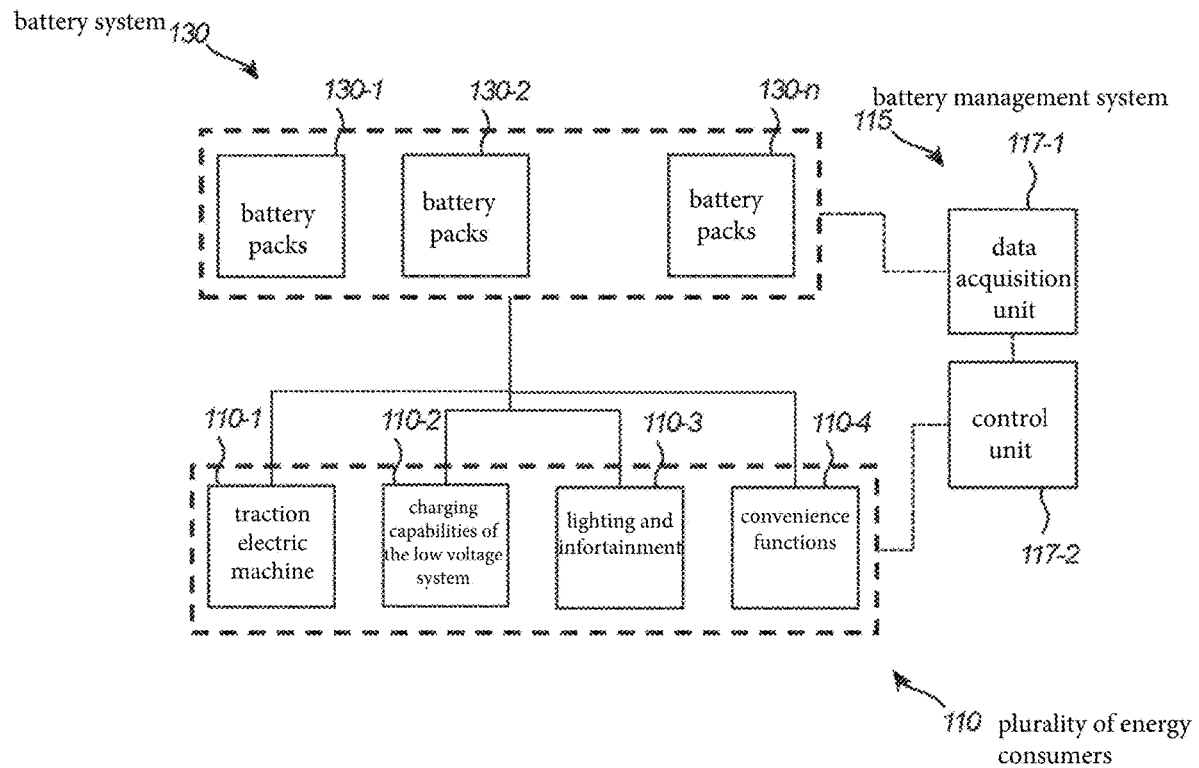
FIG. 2 is a schematic view of an energy storage or transformation system in the form of a battery system, and a battery management system, in accordance with an example embodiment of the invention.

FIG. 2 is a schematic view of an energy storage or transformation, EST, system 130, here exemplified as a battery system 130 comprising a plurality of battery packs 130-1, 130-2, 130-n where n is any integer higher than 2, and a battery management system 115. The battery packs 130-1, 130-2, 130-n are e.g. parts of at least one battery device, as e.g. parallel connected battery packs 130-1, 130-2, 130-n arranged for powering a plurality of energy consumers 110 (also referred to as loads). Each battery pack 130-1, 130-2, 130-n typically comprises a plurality of series connected battery cells. The plurality of energy consumers 110 may be independently connected and disconnected to the first, second and nth battery packs 130-1, 130-2, 130-n via contactors (not shown). The embodiment shown in FIG. 2 may for example be implemented in the vehicle 1 of FIG. 1, and thus the battery system 130 may be the EST system 30, the battery management system 115 may be the EST management system 15, and the electric machine 10 may be at least one of the plurality of energy consumers 110.

In the example of FIG. 2, the plurality of energy consumers 110 are energy consumers belonging to a predetermined group of energy consumers 110, here being a traction electric machine 110-1, charging capabilities of the low voltage system (12 V or 24V) of the vehicle 110-2 (using e.g. a DC-DC converter), lighting and infotainment 110-3, and convenience functions 110-4. The specific list of energy consumers 110-1, 110-2, 110-3, 110-4 here are only presented by way of example, and is not to be regarded as limiting in any way. Other examples of energy consumers applicable for the method of the invention, and that may be included in the predetermined group of energy consumers 110, are thermal loads and auxiliary loads, such as e.g. electric power take-off driven equipment of a working machine, and electric power steering (i.e., steering capability to manoeuvre the vehicle left and right).

The battery management system 115 comprises a data acquisition unit 117-1 configured to acquire preview information of the vehicle operation. The preview information comprises at least one of a predicted road condition and a predicted road event, as described earlier.

The battery management system 115 further comprises a control unit 117-2 configured to process the preview information with an estimation model adapted to relate a risk level associated with a power unavailability for each one of the energy consumers 110 to the at least one predicted road condition and/or predicted road event. This is achieved by classifying the energy consumers 110 with a relatively high risk level (i.e. having a risk level higher than a predetermined risk level threshold) as critical energy consumers, and the energy consumers 110 with a relatively low risk level (i.e. having a risk level lower than the predetermined risk level value) as non-critical energy consumers; estimating a required amount of energy and/or power for powering all the energy consumers 110 in the predetermined group of energy consumers 110 for the predicted road condition and/or the predicted road event; estimating the available energy and/or power of the battery system 130; and in response to determining that the required amount of energy and/or power for powering all the energy consumers 110 in the predetermined group of energy consumers 110 is lower than the available energy and/or power of the battery system 130 for the predicted road condition and/or the predicted road event, powering the energy consumers classified as critical, and deactivating the energy consumers classified as non-critical.

Hereby, the availability of the battery system 130, at least for certain particular conditions, is improved, such that the battery system 130 is able to power the critical energy consumers at the expense of the non-critical energy consumer(s), in case the available energy and/or power of the battery system 130 is limited, or at least limited for a time period associated with the predicted road condition or predicted road event.

For example, in case the predicted road event is a train crossing, the risk level associated with a power unavailability for the traction electric machine 110-1 is increased as a lack of traction could result in that the vehicle is stopped at the train crossing without being able to move for a coming train. Thus, the traction electric machine 110-1 is classified as a critical energy consumer for such preview information, and at least the convenience functions 110-4 are classified as a non-critical energy consumer in case the available energy and/or power of the battery system 130 is limited for the associated preview information.

Thus, the battery management system 115 is configured to classify energy consumers 110 in a vehicle into critical and non-critical energy consumers. Stated differently, by prioritizing, or classifying, the energy consumers 110 into critical and non-critical, a ranking algorithm is provided for the energy consumers 110 powered by the battery system 130.

Thus, the control unit 117-2 is configured to predict the upcoming vehicle situations and expected risks using the preview information. Naturally, the vehicle speed, cruise control mechanism, and other internal information from the vehicle may be used together with the preview information to predict the upcoming vehicle situations and expected risks.

The estimation model is adapted to relate the risk level of power unavailability for each one of the energy consumers 110 to the predicted road condition and/or the predicted road event. In other words, the risk level due to power unavailability for the upcoming vehicle situation is evaluated for each of the energy consumers 110. Moreover, by estimating required amount of energy and/or power of the energy consumers 110 for the upcoming vehicle situation, it can be determined whether or not the available energy and/or power of the battery system 130 are enough to meet the required amount, i.e. whether or not it is possible to avoid power unavailability for one or more of the energy consumers 110. If the required amount of energy and/or power for avoiding power unavailability of the energy consumers 110 for the upcoming vehicle situation is less than the available energy and/or power of the battery system 130 (i.e. the amount of energy and/or power is limited), at least one energy consumer 110 will suffer from power unavailability for the upcoming vehicle situation. By prioritizing the energy consumers 110 by classifying them into critical and non-critical energy consumers, the power unavailability for the upcoming vehicle situation can be better controlled. That is, the control unit 117-2 can control the powering of the energy consumers 110 such that the critical energy consumers are powered, e.g. the traction electric machine 110-1, while at least one of the non-critical energy consumers is/are not (i.e. at least one of the non-critical energy consumers are deactivated). Moreover, the critical energy consumers may be further classified based on their individual risk level, and for example classified into high critical energy consumers and low critical energy consumers. Hereby, in case the available energy and/or power is further limited, powering of only the high critical energy consumers may be achieved at the expense of not powering the low critical energy consumers.

Based on the classification and prioritization of the energy consumers 110 into critical and non-critical, the control unit 117-2 may furthermore notify the driver of the deactivation of non-critical energy consumer(s), as well as initiating emergency operations.

According to at least one example embodiment, the preview information may be used to adapt power management strategy. For example, if limitations in energy or power of the EST system is known (e.g. limitations in near future, e.g. within the next 1 s to 15 min), wherein the limitations are at least partly due to a too high temperature of battery packs (e.g. as a result of the speed and acceleration of the vehicle), the power management may be adapted to mitigate such situation (e.g. actively reduce speed or acceleration to reduce temperature of the battery packs in order to improve the energy or power availability of the EST system). Hereby, a proactive management of power and thus propulsion (and/or auxiliary loads) can be achieved.

A method for classifying a predetermined group of energy consumers in a vehicle into critical and non-critical energy consumers, such as e.g. the energy consumers 110-1, 110-2, 110-3, 110-4, of FIG. 2 will now be described in more general terms. The energy consumers are being powered by an energy storage or transformation, EST, system, such as e.g. the battery system 130 of FIG. 2.

In a first step S10, preview information of the vehicle operation is provided. The preview information comprises at least one of a predicted road condition and a predicted road event. The preview information may comprise road topography and/or current traffic conditions, as described earlier.

In a second step S20, the preview information is processed with an estimation model adapted to relate the risk level associated with a power unavailability for each one of the energy consumers to the at least one predicted road condition and/or predicted road event. The estimation model is e.g. a statistical model, or a machine learning model formed from data of power unavailability for the energy consumers related to the predicted road condition and/or the predicted road event from the vehicle or from a plurality of vehicles (as previously described).

In a third step S30 the energy consumers with a relatively high risk level, that is the energy consumers having a risk level higher than a predetermined risk level threshold value, are classified as critical energy consumers, and the energy consumers with a relatively low risk level, that is the energy consumers having a risk level lower than the predetermined risk level threshold value, are classified as non-critical energy consumers. Thus, the risk level of the energy consumers in relation to a power unavailability is a function of the preview information. That is, based on the preview information and the upcoming vehicle situation, the risk level of power unavailability is assessed, e.g. in accordance with HARA and ISO 26262 as described earlier, and used to classify the energy consumers into critical and non-critical energy consumers. The classification of the energy consumers into critical and non-critical may be performed dynamically (i.e. change over time and dependent on the preview information). According to at least one example embodiment, at least one of the energy consumers is a traction electric machine, wherein the traction electric machine is classified as a critical energy consumer.

In a fourth step S40, the required amount of energy and/or power powering all the energy consumers in the predetermined group of energy consumers for the predicted road condition and/or the predicted road event is estimated.

In a fifth step S45, the available energy and/or power of the EST system is estimated. The step S45 of estimating the available energy and/or power of the EST system may be performed in response to the preview information, i.e. for the predicted road condition and/or the predicted road event in a corresponding way as for the fourth step S40.

In a sixth step S50, in response to determining that the required amount of energy and/or power for powering all the energy consumers in the predetermined group of energy consumers is higher than the available energy and/or power of the EST system for the predicted road condition and/or the predicted road event, powering (S51) the energy consumers classified as critical, and deactivating (S52) as least one of the energy consumers classified as non-critical.

In an optional sub-step S25 of the second step S20, prior to the third step S30 of classifying the energy consumers, a vehicle situation (or an upcoming vehicle situation) is identified for each one of the energy consumers which in case of power unavailability of the energy consumer for the predicted road condition and/or the predicted road event, belong to a predetermined group of vehicle situations defined as hazardous. Thus, the risk level in the estimation model used in the second step S20 of processing the preview information may be determined in response to such hazardous vehicle situations. The upcoming vehicle situation may e.g. be defined as hazardous (or as a potentially harmful situation) in accordance with HARA and ISO 26262 as described earlier. Thus, the risk level of power unavailability for each energy consumers may be determined in response to vehicle safety. The vehicle situations belonging to the predetermined group of vehicle situations defined as hazardous may be determined by a risk level higher than the previously described predetermined risk level threshold value.

In an optional seventh step S60, and in response to determining that the required amount of energy and/or power for powering all the energy consumers in the predetermined group of energy consumers is higher than the available energy and/or power of the EST system for the predicted road condition and/or the predicted road event, the driver is warned of that prioritization of powering the critical energy consumers, and/or that deactivation of at least one of the non-critical energy consumers, are expected.

Figure 3:
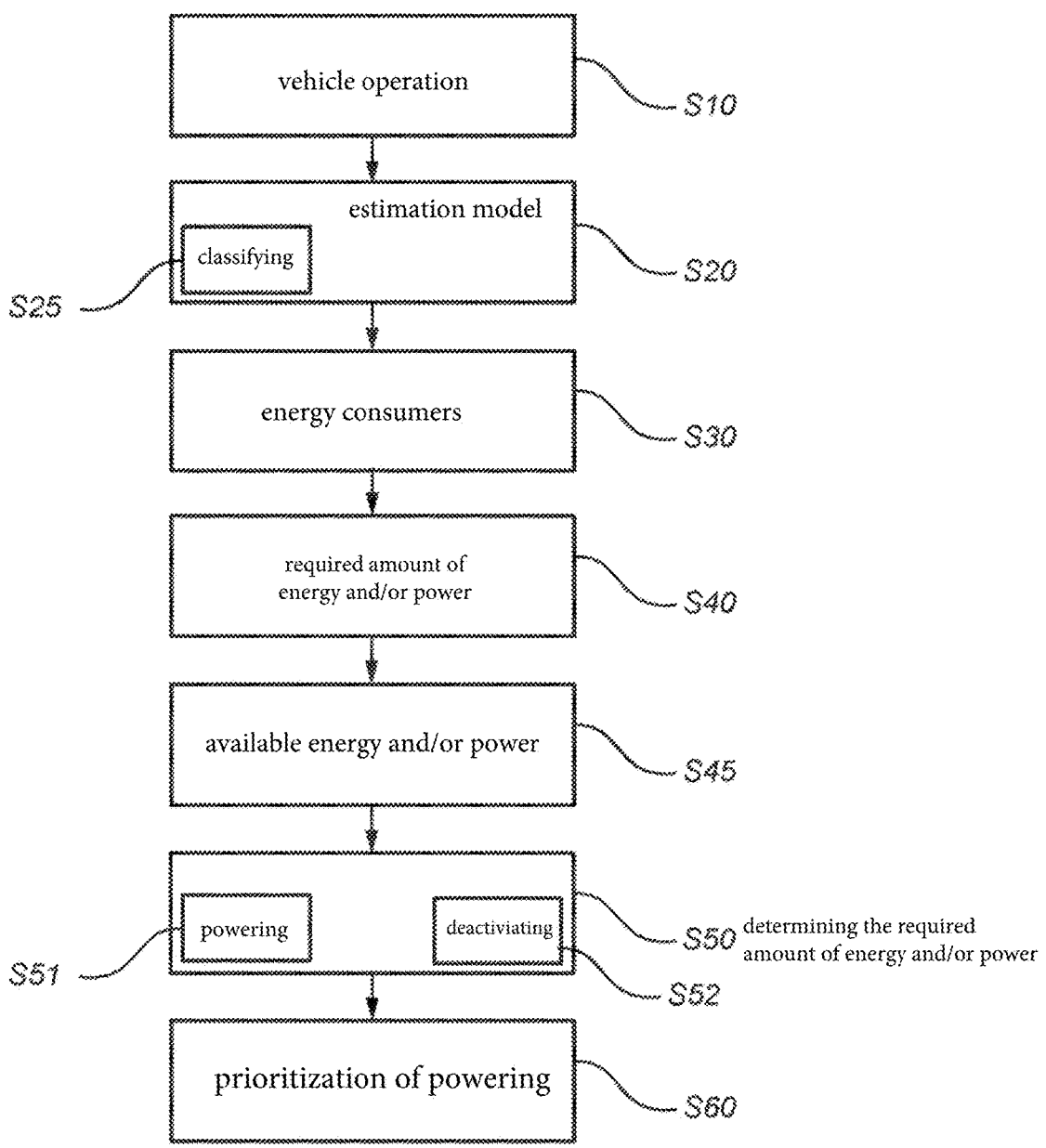
FIG. 3 is a flowchart illustrating the steps of a method in accordance with example embodiments of the invention.

According to at least one example embodiment, the battery management system 115 of FIG. 2 is configured to perform the method as described with reference to FIG. 3, for example using the data acquisition unit 117-1 and the control unit 117-2. The method as described with reference to FIG. 3 may be implemented in a computer program. Thus, the computer program may comprise program code means for performing the method as described with reference to FIG. 3, when the program is run on a computer. Alternatively the method as described with reference to FIG. 3 may be implemented in a computer readable medium carrying a computer program comprising program code means for performing the method as described with reference to FIG. 3, when the computer program is run on a computer.

It should be noted that the naming of the steps not necessarily, but might according to at least one example embodiment, relate to the order in which the steps are carried out. Thus, the order of the steps may be different than that explained here, and the controlling apparatus 17 of FIG. 1 (or data acquisition unit 117-1 and control unit 117-2 of FIG. 2) may be configured to carry out one or several of the steps. Moreover, one or more of the steps may be combined and carried out simultaneously. It should also be noted that the data acquisition unit 117-1, the control unit 117-2, and potentially the vehicle electronic power steering controllers 118 of FIG. 2 may be incorporated into a single controlling apparatus, as controlling apparatus 17 of FIG. 1.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any standard (such as ISO 26262) mentioned in the present application are to be based on instructions valid on the date of priority of the present application.

The invention claimed is:

1. A method for classifying a predetermined group of energy consumers in a vehicle into critical and non-critical energy consumers being powered by an energy storage or transformation (EST) system, the method comprises:
    providing preview information of vehicle operation, the preview information comprising at least one of a predicted road condition and a predicted road event;
    processing the preview information with an estimation model adapted to relate a risk level associated with a power unavailability for each one of the energy consumers to the at least one predicted road condition and/or predicted road event;
    classifying the energy consumers having a risk level higher than a predetermined risk level threshold value as critical energy consumers, and classifying the energy consumers with a risk level lower than the predetermined risk level threshold value as non-critical energy consumers;
    estimating a required amount of energy and/or power for powering all the energy consumers in the predetermined group of energy consumers for the predicted road condition and/or the predicted road event;
    estimating an available energy and/or power of the EST system;
    in response to determining that the required amount of energy and/or power for powering all the energy consumers in the predetermined group of energy consumers is higher than the available energy and/or power of the EST system for the predicted road condition and/or the predicted road event, powering the energy consumers classified as critical, and deactivating at least one of the energy consumers classified as non-critical.

2. The method according to claim 1, wherein the classification of the energy consumers is performed dynamically.

3. The method according to claim 1, wherein at least one of the energy consumers in the predetermined group of energy consumers is a traction electric machine, and wherein classifying the energy consumers comprises classifying the traction electric machine as a critical energy consumer.

4. The method according to claim 1, comprising:
identifying, for each one of the energy consumers, a vehicle situation which, in case of power unavailability of the energy consumer for the predicted road condition and/or the predicted road event, belong to a predetermined group of vehicle situations defined as hazardous, and wherein the risk level of the estimation model is determined in response to such hazardous vehicle situations.

5. The method according to claim 4, wherein the vehicle situations belonging to the predetermined group of vehicle situations defined as hazardous has risk level higher than the predetermined risk level threshold value.

6. The method according to claim 1, wherein the step of estimating the available energy and/or power of the EST system is carried out for the predicted road condition and/or the predicted road event.

7. The method according to claim 1, wherein the preview information comprises road topography and/or current traffic conditions.

8. The method according to claim 1, wherein the estimation model is a statistical model, or a machine learning model formed from data of power unavailability for the energy consumers related to the predicted road condition and/or the predicted road event from the vehicle or from a plurality of vehicles.

9. The method according to claim 1, further comprising:
in response to determining that the required amount of energy and/or power for powering all the energy consumers in the predetermined group of energy consumers is higher than the available energy and/or power of the EST system for the predicted road condition and/or the predicted road event, warning a driver that prioritization of powering the critical energy consumers, and/or that deactivation of at least one of the non-critical energy consumers, are expected.

10. A computer program comprising program code for performing the method of claim 1 when said program code is run on a computer.

11. A non-transitory computer readable medium carrying a computer program comprising program code for performing the method of claim 1 when said computer code is run on a computer.

12. A controlling apparatus for classifying energy consumers in a vehicle into critical and non-critical energy consumers, the controlling apparatus being configured to perform the method according to claim 1.

13. A system for classifying a predetermined group of energy consumers in a vehicle into critical and non-critical energy consumers, the energy consumers being powered by an energy storage or transformation, EST, system, characterised by:
a data acquisition unit configured to acquire preview information of the vehicle operation, the preview information comprising at least one of a predicted road condition and a predicted road event; and
a control unit configured to:
process the preview information with an estimation model adapted to relate a risk level associated with a power unavailability for each one of the energy consumers to the at least one predicted road condition and/or predicted road event;
classify the energy consumers having risk level higher than a predetermined risk level threshold value as critical energy consumers, and classify the energy consumers with a risk level lower than the predetermined risk level threshold value as non-critical energy consumers;
estimate a required amount of energy and/or power for powering all the energy consumers in the predetermined group of energy consumers for the predicted road condition and/or the predicted road event;
estimate the available energy and/or power of the EST system;
in response to determining that the required amount of energy and/or power for powering all the energy consumers in the predetermined group of energy consumers is higher than the available energy and/or power of the EST system for the predicted road condition and/or the predicted road event, powering the energy consumers classified as critical, and deactivating at least one of the energy consumers classified as non-critical.

14. A vehicle comprising a system according to claim 13.

* * * * *